(12) United States Patent
Kojima

(10) Patent No.: US 10,830,265 B2
(45) Date of Patent: Nov. 10, 2020

(54) GASKET

(71) Applicant: NOK Corporation, Tokyo (JP)

(72) Inventor: Yasushi Kojima, Fukushima (JP)

(73) Assignee: NOK CORPORATION (JP)

( * ) Notice: Subject to any disclaimer, the term of this patent is extended or adjusted under 35 U.S.C. 154(b) by 0 days.

(21) Appl. No.: 15/757,145

(22) PCT Filed: Aug. 29, 2016

(86) PCT No.: PCT/JP2016/075252
§ 371 (c)(1),
(2) Date: Mar. 2, 2018

(87) PCT Pub. No.: WO2017/038785
PCT Pub. Date: Mar. 9, 2017

(65) Prior Publication Data
US 2018/0252246 A1    Sep. 6, 2018

(30) Foreign Application Priority Data

Sep. 3, 2015 (JP) .................................. 2015-173978

(51) Int. Cl.
*F16J 15/08* (2006.01)
*F16B 2/24* (2006.01)
*F16B 5/02* (2006.01)

(52) U.S. Cl.
CPC .................. *F16B 2/24* (2013.01); *F16B 5/02* (2013.01); *F16J 15/08* (2013.01)

(58) Field of Classification Search
CPC .. F16J 15/061; F16J 15/06; F16J 15/08; F16J 15/10
(Continued)

(56) References Cited

U.S. PATENT DOCUMENTS 1,985,473 A * 12/1934 Victor .................... F16J 15/123
277/593
2,004,967 A    6/1935 Williams
(Continued)

FOREIGN PATENT DOCUMENTS

CN         201925047 U    8/2011
DE    10-2012-021683 A1    5/2014
(Continued)

OTHER PUBLICATIONS

ISR/JP, International Search Report for PCT/JP2016/075252, dated Nov. 1, 2016.
(Continued)

*Primary Examiner* — Kristina R Fulton
*Assistant Examiner* — L. Susmitha Koneru
(74) *Attorney, Agent, or Firm* — Harness, Dickey & Pierce, P.L.C.

(57) ABSTRACT

A gasket includes a gasket body formed of a metal plate and provided with at least two locking hook portions formed to project from the gasket body and abut against side wall surfaces adjacent to a counter sealing surface. The locking hook portions include curved portions at distal end portions of the respective locking hook portions abutting against the side wall surfaces, at least one of the locking hook portions being formed to be bent toward an inside of the gasket body such that an angle made with the gasket body is an acute angle, and press the curved portions against the side wall surfaces by spring force of the locking hook portion bent at the acute angle, allowing the gasket body to hold itself on the counter sealing surface.

5 Claims, 6 Drawing Sheets

(58) Field of Classification Search
USPC .................................. 277/598, 616, 630, 637
See application file for complete search history.

(56) References Cited

U.S. PATENT DOCUMENTS

| | | | |
|---|---|---|---|
| 2,125,843 A | | 8/1938 | Hall |
| 2,550,591 A | | 4/1951 | Parsons |
| 2,639,832 A | * | 5/1953 | Bergstrom ............... F16J 15/02 |
| | | | 403/288 |
| 4,272,085 A | * | 6/1981 | Fujikawa ............... F16J 15/123 |
| | | | 277/594 |
| 4,650,227 A | * | 3/1987 | Babuder ............. F16L 19/0212 |
| | | | 277/609 |
| 4,838,583 A | * | 6/1989 | Babuder ............. F16L 19/0212 |
| | | | 277/609 |
| 5,145,219 A | * | 9/1992 | Babuder ............. F16L 19/0212 |
| | | | 277/609 |
| 5,163,719 A | * | 11/1992 | Washizu ............. F16L 37/0987 |
| | | | 285/319 |
| 5,203,576 A | * | 4/1993 | Miyaoh ............... F01N 13/1805 |
| | | | 277/598 |
| 5,333,884 A | | 8/1994 | Miyaoh et al. |
| 5,366,261 A | * | 11/1994 | Ohmi ................. F16L 19/0212 |
| | | | 285/328 |
| 5,409,270 A | * | 4/1995 | Shinohara ........... F16L 19/0212 |
| | | | 277/609 |
| 5,645,282 A | * | 7/1997 | Belter .................... F16J 15/061 |
| | | | 277/598 |
| 6,769,851 B2 | * | 8/2004 | Agha .................... F16B 41/002 |
| | | | 411/161 |
| 9,879,779 B2 | | 1/2018 | Guidi et al. |
| 2008/0150240 A1 | * | 6/2008 | Isono .................... F16J 15/025 |
| | | | 277/650 |
| 2014/0252724 A1 | * | 9/2014 | Guidi .................... F16J 15/061 |
| | | | 277/630 |

FOREIGN PATENT DOCUMENTS

| | | | |
|---|---|---|---|
| JP | | 54142542 | 10/1979 |
| JP | | H04-68249 U | 6/1992 |
| JP | | H0717884 Y2 | 4/1995 |
| JP | | 2003227407 A | 8/2003 |
| JP | | 2003-262272 A | 9/2003 |
| JP | | 2012052605 A | 3/2012 |
| JP | | 5632941 B1 | 11/2014 |
| JP | | 2015025531 A | * 2/2015 |
| JP | | 2015025531 A | 2/2015 |

OTHER PUBLICATIONS

Extended European Search Report for Application No. EP 16 84 1817 dated Feb. 11, 2019 (7 pages).
First Chinese Office Action for Patent Application No. CN201680050696.6 dated Mar. 8, 2019 (13 pages).
Second Chinese Office Action for Patent Application No. CN201680050696.6 dated Sep. 12, 2019 (10 pages).
Japanese Office Action for corresponding Japanese Application No. 2017-506953 dated Apr. 21, 2020 with English translation (6 pages).
Third Chinese Office Action for Patent Application No. CN201680050696.6 dated Mar. 2, 2020 (10 pages) with English translation.
Chinese Office Action for corresponding Patent Application No. CN201680050696.6 dated Jul. 8, 2020 (7 pages) with English translation.

* cited by examiner (a)

(b)

GASKET

TECHNICAL FIELD

The present invention relates to a gasket, more specifically, a gasket in which at least two locking hook portions abutting against side wall surfaces adjacent to a counter sealing surface are formed to project from a gasket body formed of a metal plate.

BACKGROUND

A gasket is held between two members, to prevent leakage of a sealed fluid to the outside by sealing the space between the two members. Assembly of the gasket is performed by placing a gasket on a counter sealing surface of one member, covering the gasket with the other member, and fastening the two members with bolts.

When a gasket is placed on the counter sealing surface, the gasket may be displaced or fall from the counter sealing surface. In particular, such displacement or falling probably occur when the counter sealing surface faces sideways or downward. In this case, using positioning pins is possible, but positioning pins are not applicable to small-sized products, and have a problem of increase in number of components and increase in cost.

For this reason, for the purpose of temporary joint in assembly to the gasket side, a method involving temporarily jointing a gasket is known (Patent Documents 1 to 3). In the temporary joint, part of the gasket body is bent at right angles, a distal end of the part is provided with a locking portion provided with a projection projecting inward, and hooking the projection on an engaging recessed portion provided on a back surface of a flange portion or an external circumferential surface of the flange portion serving as the counter seal surface.

However, in this case, the length of the locking portion to the projection should be individually set in accordance with the thickness of the flange portion and the size thereof to the recessed portion. In addition, it has the problem that it cannot be used at all when the side wall surfaces adjacent to the counter seal surface are flat surfaces without portions to lock the projection.

Patent Document 3 also discloses bending a flat-plate-shape locking portion inward at an acute angle without a projection, and holding the gasket by spring force thereof. However, this structure has the problem that the counter wall surface is damaged when the gasket is assembled.

SUMMARY OF THE INVENTION

An object of the present invention is to provide a gasket capable of holding itself without need for hooking a locking hook portion formed on the gasket body on the counter member when mounted on the counter member, and preventing fear for damaging the counter wall surface.

Other objects of the present invention will be apparent from the following description.

The above-described problems are solved by the following respective inventions.

A gasket comprises a gasket body formed of a metal plate and at least two locking hook portions formed to project from the gasket body and abutting against side wall surfaces adjacent to a counter sealing surface. The locking hook portions include curved portions at distal end portions of the respective locking hook portions abutting against the side wall surfaces. At least one of the locking hook portions being formed to be bent toward an inside of the gasket body such that an angle made with the gasket body is an acute angle, and pressing the curved portions against the side wall surfaces by spring force of the locking hook portion bent at the acute angle. This allows the gasket body to hold the gasket body itself on the counter sealing surface.

The locking hook portion other than the locking hook portion bent at the acute angle is formed to be bent at right angles to the gasket body, and abuts against the side wall surface to regulate a position of the gasket body with respect to the counter sealing surface.

In one of the previous embodiments, each of the curved portions is formed of a curved surface curved by bending the distal end portion of the locking hook portion.

In one of the previous embodiments, the curved portion is a spherical projection.

In one of the previous embodiments, surfaces of at least the locking hook portions are covered with a rubber-like elastic member.

The present invention provides a gasket capable of holding itself without need for hooking a locking hook portion formed on the gasket body on the counter member when mounted on the counter member, and preventing fear for damaging the counter wall surface.

DESCRIPTION OF THE PREFERRED EMBODIMENTS

The following is explanation of embodiments of the present invention with reference to drawings.

First Embodiment

Figure 1:
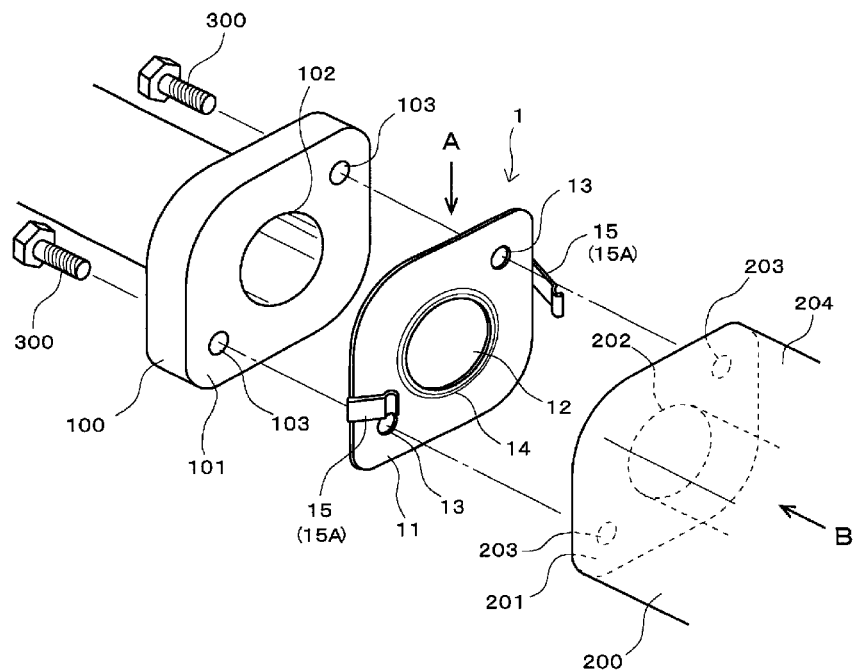
FIG. 1 is an exploded perspective view illustrating an assembly state of a gasket according to a first embodiment of the present invention.
Figure 2:
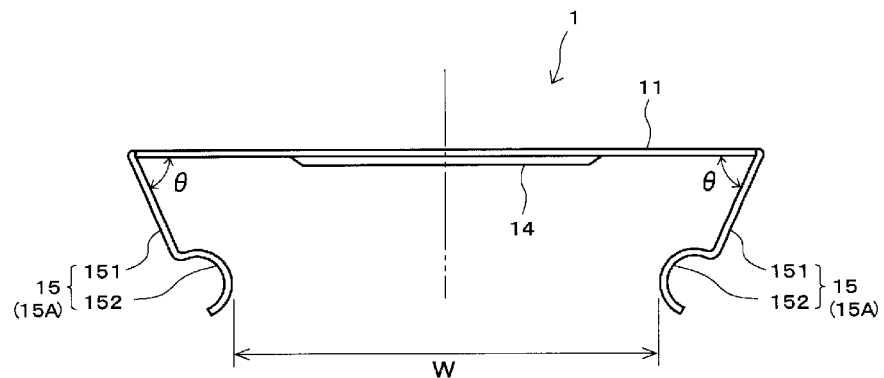
FIG. 2 is a side view illustrating the gasket illustrated in FIG. 1 as viewed from direction A.
Figure 3:
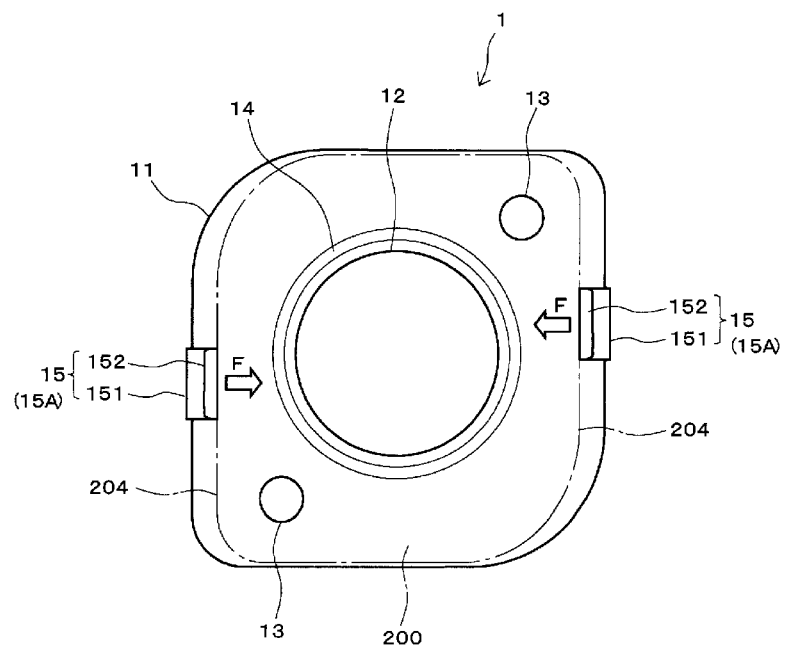
FIG. 3 is a diagram illustrating the assembly state of the gasket illustrated in FIG. 1 as viewed from direction B.
Figure 4:
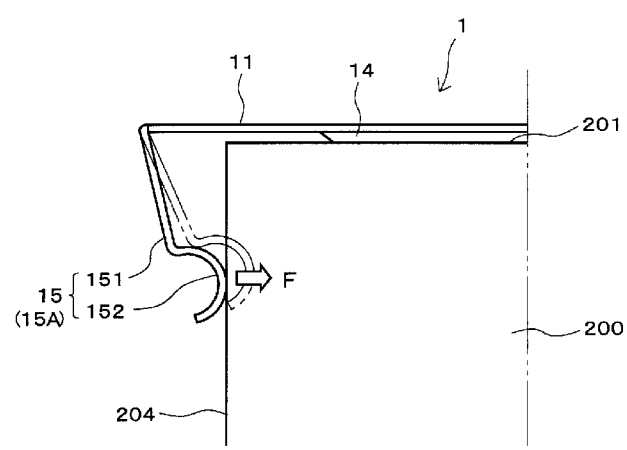
FIG. 4 is a diagram illustrating a function of the gasket illustrated in FIG. 1.
Figure 5:
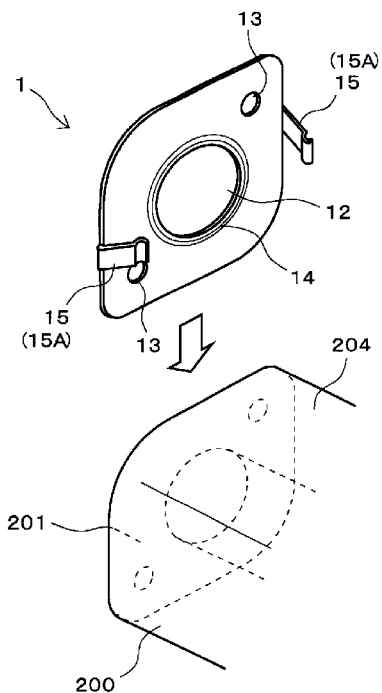
FIG. 5 is a diagram illustrating an example of a method for assembling the gasket illustrated in FIG. 1.

FIG. 1 is an exploded perspective view illustrating an assembly state of a gasket according to a first embodiment of the present invention, FIG. 2 is a side view illustrating the gasket illustrated in FIG. 1 as viewed from direction A, FIG. 3 is a diagram illustrating the assembly state of the gasket illustrated in FIG. 1 as viewed from direction B in FIG. 1, FIG. 4 is a diagram illustrating a function of the gasket illustrated in FIG. 1, and FIG. 5 is a diagram illustrating an example of a method for assembling the gasket illustrated in FIG. 1.

As illustrated in FIG. 1, a gasket 1 is disposed between two facing sealing surfaces 101 and 201 of a pair of members 100 and 200. The members 100 and 200 are provided with opening portions 102 and 202 through which fluid passes, and bolt holes 103 and 203, respectively.

The gasket 1 has a structure in which a gasket body (gasket main member) 11 formed of a metal plate, such as a stainless plate, a cold-rolled steel plate, a zinc-plated steel plate, and an aluminum alloy plate, is provided with an opening portion 12 corresponding to the opening portions 102 and 202 of the members 100 and 200 and letting fluid pass therethrough, and bolt holes 13 through which bolts 300 are inserted in fastening. A bead portion 14 is formed around the opening portion 12 to project to a surface facing the sealing surface 201 of the member (one member) 200.

The gasket 1 is provided with locking hook portions 15 abutting against side wall surfaces 204 adjacent to the sealing surface (counter sealing surface) 201. The locking hook portions 15 are formed to project as one unitary piece from the gasket body 11.

The locking hook portions 15 allow the gasket 1 to hold itself on the sealing surface 201 of the member 200. Each of the locking hook portions 15 includes a flat plate portion 151 coupled with the gasket body 11, and a curved portion 152 coupled with a distal end portion of the flat plate portion 151.

The flat plate portion 151 is formed as one unitary piece with the gasket body 11, to project sideward from the gasket body 11. In addition, the flat plate portion 151 is bent from a portion coupled with the gasket body 11 toward the inside of the gasket body 11.

The curved portion 152 is formed of a curved surface that is curved by bending a distal end portion of the locking hook portion 15. Specifically, the curved surface is formed by bending the distal end of the flat plate portion 151 toward the inside of the gasket body 11, and thereafter further curving the distal end side in an arc shape toward the outside of the gasket body 11. Accordingly, the curved portion 152 is disposed to project toward the inside of the locking hook portion 15.

In each of the locking hook portions 15 formed as described above, the flat plate portion 151 is formed and bent such that an angle θ made between the flat plate portion 151 and the gasket body 11 is an acute angle (<90°). In the following explanation, the locking hook portion 15 will be referred to as "first locking hook portion 15A" when only the locking hook portion 15 bent at an acute angle is indicated in the specification.

The following is explanation of arrangement and structure of the locking hook portions 15.

In the gasket 1 illustrated in FIG. 1 to FIG. 3, a pair of first locking hook portions 15A and 15A having the same shape are arranged as the locking hook portions 15, to face each other with the opening portion 12 interposed therebetween. As illustrated in FIG. 2, a width W between the curved portions 152 and 152 of the first locking hook portions 15A and 15A is formed to be properly smaller than a width (external diameter) of the member 200 on which the gasket 1 is held.

When the gasket 1 is mounted between the two members 100 and 200, the gasket 1 is attached to the sealing surface 201 to cause the curved portions 152 and 152 of the first locking hook portions 15A and 15A to abut against the side wall surfaces 204 of the member 200. Each of the first locking hook portions 15A is bent inward at an acute angle with respect to the gasket body 11, and the width W between the curved portions 152 and 152 is smaller than the width (external diameter) of the member 200. For this reason, in the attachment, the first locking hook portions 15A and 15A are mutually spread outward, from the state illustrated with alternate long and short dash lines in FIG. 4 to the state illustrated with solid lines. In this state, spring force (restoring force) to returning to the original state acts on the flat plate portion 151 of each first locking hook portion 15A. By the spring force, the curved portions 152 contact the side wall surfaces 204 to cause local surface pressure, and cause pressing force F (illustrated with an outline arrow in the drawing) to act on the side wall surfaces 204 from both lateral sides of the member 200.

In this manner, the gasket 1 holds itself on the sealing surface 201, and prevents itself from falling off. The self-holding of the gasket 1 is achieved by a pair of first locking hook portions 15A and 15A abutting against the side wall surfaces 204 and holding both lateral sides of the member 200, and does not need hooking projections on the counter member, unlike prior art. This structure does not require setting the length of the locking hook portions 15 in accordance with the thickness of the flange of the counter member, or providing the counter member with recessed portions to hook the locking hook portions on the counter member. In addition, the portions abutting against the side wall surfaces 204 are surfaces of the curved portions 152. This structure removes the fear of damaging the counter wall surfaces.

After the gasket 1 is mounted on the member (other member) 200 as described above, the gasket 1 is held between the member 200 and the member 100, and they are fastened together with bolts 300. In this manner, the bead portion 14 is compressed, and a sealing line is formed on the sealing surfaces 101 and 201 with the reaction force of the bead portion 14 in the compression. The sealing line seals the space between the opening portions 102 and 202, and prevents the fluid inside from leaking outside.

Because the distal ends of the first locking hook portions 15A and 15A disposed to face each other are curved portions 152 without fear of damaging the counter wall surfaces, the method for mounting the gasket 1 is not limited to a method of mounting the gasket 1 in a direction perpendicular to the sealing surface 201. For example, as illustrated in FIG. 5, this structure enables adoption of a method for mounting the gasket 1 in a direction parallel with the sealing surface 201.

Figure 6:
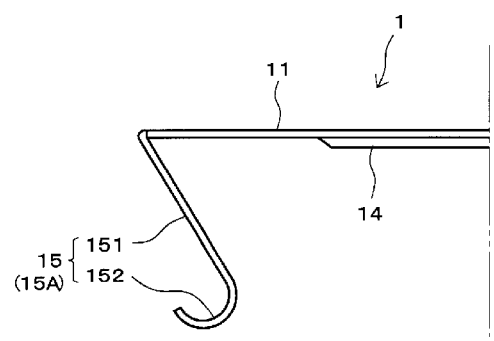
FIG. 6 is a side view illustrating another example of a locking hook portion.

In the present invention, the shape of the curved portions 152 of the locking hook portions 15 is not limited to one described above, but may be any shape as long as curved surfaces of the curved portions 152 can contact the side wall surfaces 204. For example, as illustrated in FIG. 6, the distal end of each flat plate portion 151 may be curved in an arc shape toward the outside of the gasket body 11, to form the curved portion 152 formed of a curved surface such that the curved portion 152 faces inside the gasket body 11.

Figure 7:
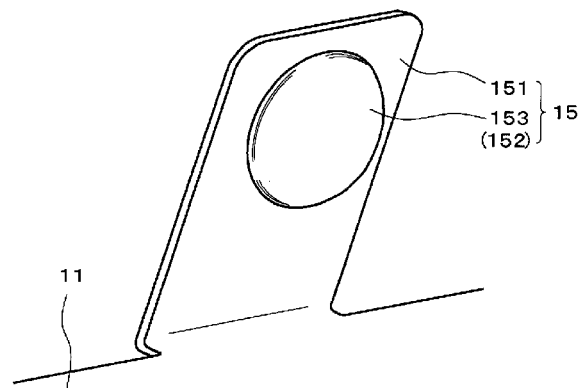
FIG. 7 is a perspective view illustrating another example of the locking hook portion.

In addition, as illustrated in FIG. 7, the curved portion 152 may be formed by providing a spherical projection 153 projecting toward the inside of the gasket body 11 on the distal end portion of each flat plate portion 151.

Second Embodiment

Figure 8:
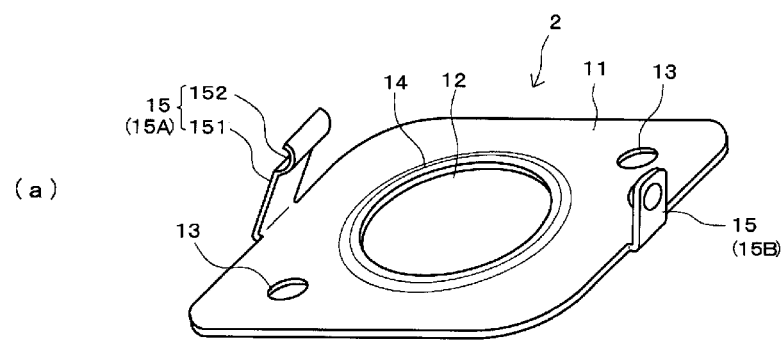
FIG. 8(*a*) is a perspective view of a gasket according to a second embodiment of the present invention, and FIG. 8(*b*) is a diagram illustrating an assembly state of the gasket illustrated in FIG. 8(*a*) as viewed from the same direction as direction B in FIG. 1.
Figure 8:
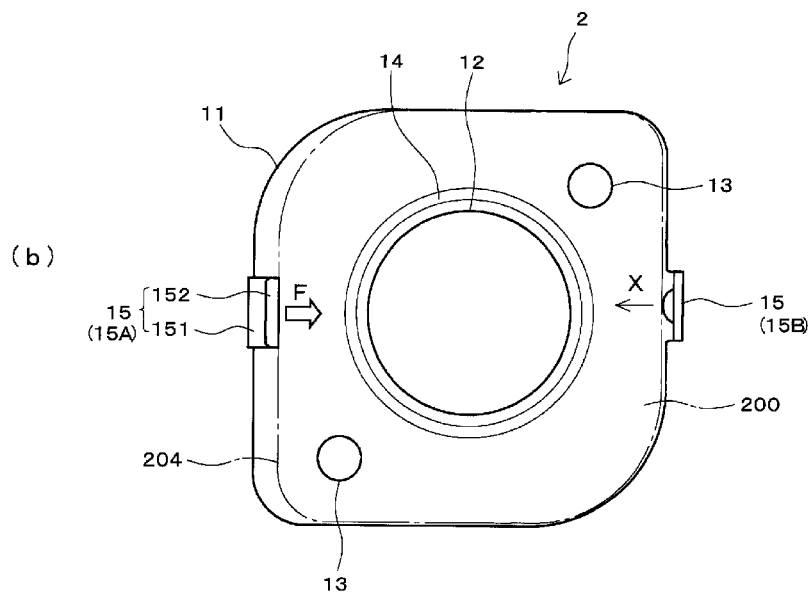

FIGS. 8(a) and 8(b) illustrate a gasket according to a second embodiment of the present invention, 8(a) is a perspective view of the gasket, and 8(b) is a diagram illustrating an assembly state of the gasket illustrated in FIG. 8(a) as viewed from the same direction as direction B in FIG. 1. Elements with the same reference numerals as those of FIG. 1 to FIG. 7 are elements of the same structures, and explanation thereof is omitted herein, quoting the explanation described above.

A gasket 2 in the present embodiment has a structure in which one locking hook portion 15 in a pair of locking hook portions 15 arranged to face each other with the opening portion 12 interposed therebetween is formed of a first locking hook portion 15A formed to be bent inward such that an angle θ formed with the gasket body 11 is an acute angle, and the other locking hook portion 15 is formed and bent at right angles to the gasket body 11. In the present specification, the locking hook portion 15 bent at right angles will be referred to as "second locking hook portion 15B" hereinafter when only the locking hook portion 15 bent at right angles is indicated.

In FIGS. 8(a) and 8(b), the first locking hook portion 15A used is the locking hook portion having the same shape as the first locking hook portion 15A illustrated in FIG. 2, but the first locking hook portion 15A may be one illustrated in FIG. 6 or FIG. 7. The second locking hook portion 15B used has the structure of including the spherical projection 153 illustrated in FIG. 7 except for the angle made with respect to the gasket body 11, but the second locking hook portion 15B may be one illustrated in FIG. 2 or FIG. 6.

When the gasket 2 is mounted on the member 200, in the same manner as the case of the gasket 1, the curved portion 152 is brought into contact with the side wall surface 204 using the spring force of the first locking hook portion 15A, to cause pressing force F (illustrated with an outline arrow in FIG. 8) to act. However, the second locking hook portion 15B disposed to be opposed to the first locking hook portion 15A is formed to be bent at right angles to the gasket body 11, and hardly generates the spring force.

For this reason, the gasket body 11 is moved toward an X direction opposite to the direction of the pressing force F in FIG. 8(b), by the pressing force F generated by the first locking hook portion 15A. As a result, the second locking hook portion 15B abuts against the side wall surface 204 of the member 200. In this manner, the gasket 2 holds itself by clipping and pressing the member 200 from both lateral sides thereof with the first locking hook portion 15A and the second locking hook portion 15B, and produces the same effect as that of the gasket 1.

In addition, the gasket 2 regulates the position of the gasket body 11 with respect to the sealing surface 201, with the second locking hook portion 15B abutting against the side wall surface 204 of the member 200. This structure allows the gasket 2 to hold itself such that the position of the gasket 2 with respect to the sealing surface 201, more specifically, the position of the bead portion 14 can be held in a more proper position, and enables securer exhibition of the sealing function.

Third Embodiment

Figure 9:
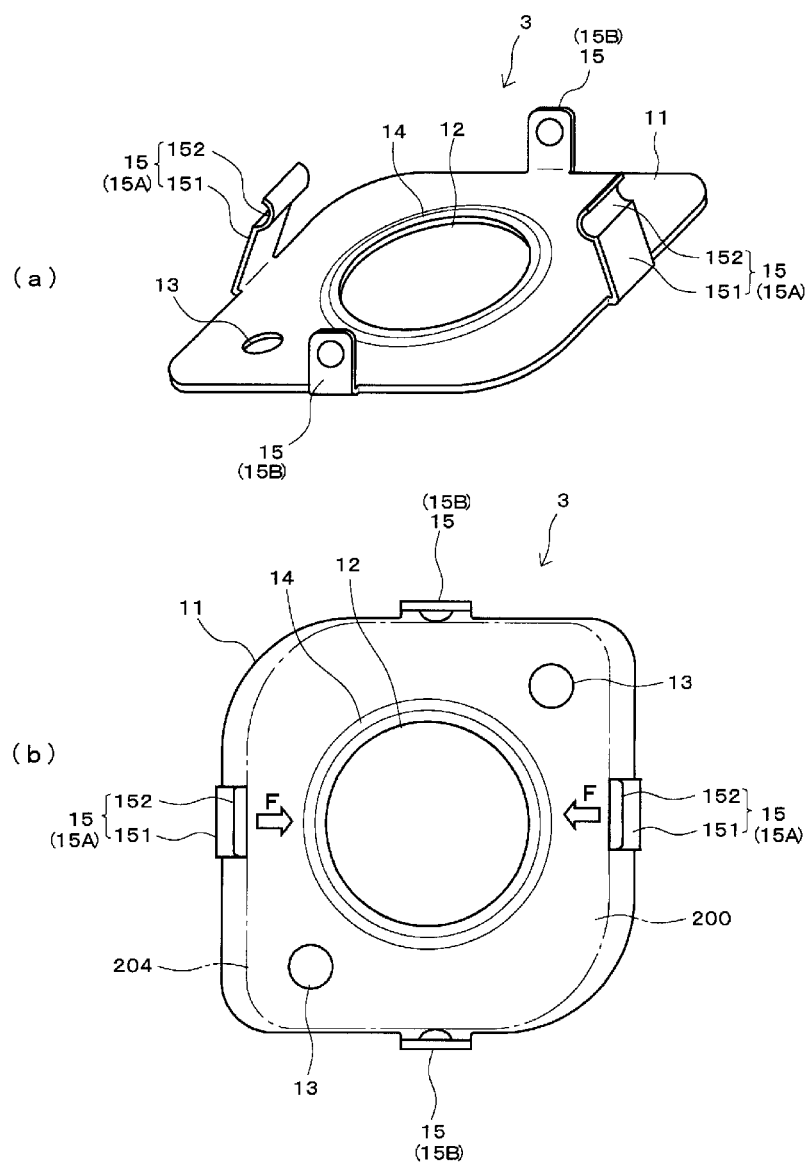
FIG. 9(*a*) is a perspective view of a gasket according to a third embodiment of the present invention, and FIG. 9(*b*) is a diagram illustrating an assembly state of the gasket illustrated in FIG. 9(*a*) as viewed from the same direction as direction B in FIG. 1.

FIGS. 9(a) and 9(b) illustrate a gasket according to a third embodiment of the present invention, FIG. 9(a) is a perspective view of the gasket, and FIG. 9(b) is a diagram illustrating an assembly state of the gasket illustrated in FIG. 9(a) as viewed from the same direction as direction B in FIG. 1. Elements with the same reference numerals as those of FIG. 1 to FIG. 8 are elements of the same structures, and explanation thereof is omitted herein, quoting the explanation described above.

A gasket 3 in the present embodiment has a structure obtained by adding a pair of second locking hook portions 15B and 15B arranged to face each other with the opening portion 12 interposed therebetween to the gasket 1 illustrated in FIG. 1 to FIG. 3. The first locking hook portions 15A and 15A and the second locking hook portions 15B and 15B are arranged in positions rotated by 90° with the opening portion 12 serving as the center, as illustrated in FIG. 9(b).

When the gasket 3 is mounted on the member 200, in the same manner as the case of the gasket 1, the gasket body 11 holds itself on the sealing surface 201, by the spring force of the first locking hook portions 15A and 15A. This structure produces the same effect as that of the gasket 1.

In addition, with the gasket 3, the second locking hook portions 15B and 15B abut against the respective side wall surfaces 204 of the member 200 to hold the side wall surfaces 204 therebetween from both lateral sides of the member 200, to regulate the position in a direction orthogonal to a direction in which the pressing force F (illustrated with an outline arrow in the drawing) with the first locking hook portion 15A acts. This structure allows the gasket 3 to hold itself such that the position of the gasket 3 with respect to the sealing surface 201, more specifically, the position of the bead portion 14 can be held in a more proper position, and enables securer exhibition of the sealing function.

Fourth Embodiment

Figure 10:
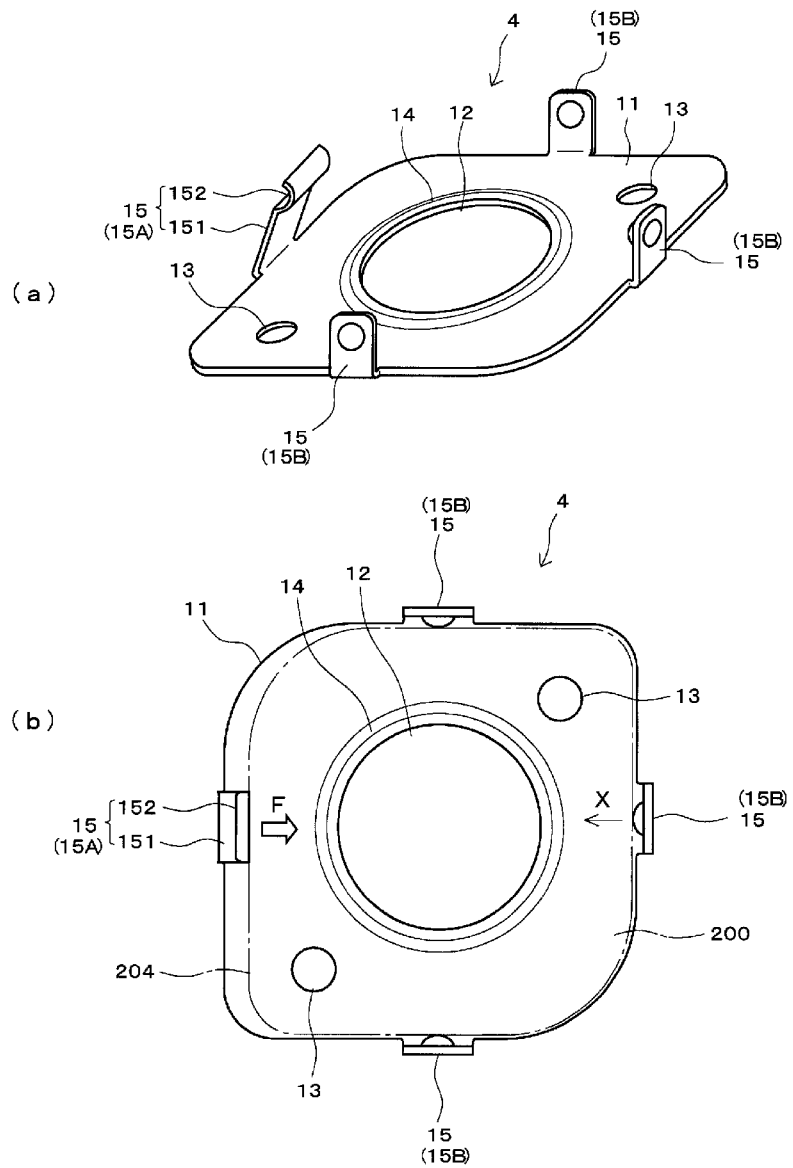
FIG. 10(*a*) is a perspective view of a gasket according to a fourth embodiment of the present invention, and FIG. 10(*b*) is a diagram illustrating an assembly state of the gasket illustrated in FIG. 10(*a*) as viewed from the same direction as direction B in FIG. 1.

FIGS. 10(a) and 10(b) illustrate a gasket according to a fourth embodiment of the present invention, FIG. 10(a) is a perspective view of the gasket, and FIG. 10(b) is a diagram illustrating an assembly state of the gasket illustrated in FIG. 10(a) as viewed from the same direction as direction B in FIG. 1. Elements with the same reference numerals as those of FIG. 1 to FIG. 8 are elements of the same structures, and explanation thereof is omitted herein, quoting the explanation described above.

A gasket 4 in the present embodiment has a structure obtained by further adding a pair of second locking hook portions 15B and 15B arranged to face each other with the opening portion 12 interposed therebetween to the gasket 2 illustrated in FIGS. 8(a) and 8(b). The added second locking hook portions 15B and 15B are arranged in positions rotated by 90° from the first locking hook portion 15A and the second locking hook portion 15B arranged to face each other in the gasket 2, with the opening portion 12 serving as the center, as illustrated in FIG. 10(b).

When the gasket 4 is mounted on the member 200, in the same manner as the case of the gasket 2, the gasket body 11 can hold itself on the sealing surface 201 with the first locking hook portion 15A and the second locking hook portion 15B facing each other, to produce the same effect as that of the gaskets 1 and 2.

In addition, with the gasket 4, in the same manner as the gasket 3, the second locking hook portions 15B and 15B forming a pair abut against the respective side wall surfaces 204 of the member 200 to hold the side wall surfaces 204 therebetween from both lateral sides of the member 200, to regulate the position in a direction orthogonal to a direction in which the pressing force F (illustrated with an outline arrow in the drawing) with the first locking hook portion 15A acts. In comparison with the case of the gasket 2, this structure allows the gasket 4 to hold itself such that the position of the gasket 4 with respect to the sealing surface 201, more specifically, the position of the bead portion 14 can be held in a more proper position, and enables securer exhibition of the sealing function.

In the gaskets 1 to 4 described above, the surface (one surface or both surfaces) may be covered with a rubber-like elastic member. Examples of the rubber-like elastic member include nitrile rubber, styrene-butadiene rubber, fluororubber, acrylic rubber, and silicon rubber. These rubber-like elastic members may be used alone, or the rubber-like elastic member may be synthetic rubber (including foam rubber) containing at least one of these rubbers.

Although the rubber-like elastic member may cover the whole surface of each of the gaskets 1 to 4, the rubber-like elastic member preferably cover at least the surface of the locking hook portions 15 (first locking hook portion 15A, and second locking hook portion 15B). With this structure, when the curved portions 152 of the locking hook portions 15 (in particular, the first locking hook portion 15A) abut against the side wall surfaces 204, the rubber layers on the surfaces thereof bite into the side wall surfaces 204, whereby the gaskets 1 to 4 can securely hold itself. The rubber-like elastic member may be formed on only the surfaces of the curved portions 152.

In the case of covering the surface with such a rubber-like elastic member, an undercoat treatment layer is preferably formed on the surface of the gasket body 11 and/or the locking hook portions 15, to improve adhesiveness of the rubber-like elastic member.

The plane shape of the gasket according to the present invention is not limited to the shape described above, but may properly be set in accordance with the counter sealing surface. As a matter of course, the locking hook portions 15 (first locking hook portion 15A, and second locking hook portion 15B) may have proper arrangement forms accordingly.

EXPLANATIONS OF LETTERS OR NUMERALS 1, 2, 3, 4: GASKET
11: GASKET BODY
12: OPENING PORTION
13: BOLT HOLE
14: BEAD PORTION
15: LOCKING HOOK PORTION
15A: FIRST LOCKING HOOK PORTION
15B: SECOND LOCKING HOOK PORTION
151: FLAT PLATE PORTION
152: CURVED PORTION
153: SPHERICAL PROJECTION (CURVED PORTION)
100, 200: MEMBER
101, 201: SEALING SURFACE (COUNTER SEALING SURFACE)
102, 202: OPENING PORTION
103, 203: BOLT HOLE
204: SIDE WALL SURFACE
300: BOLT

The invention claimed is:

1. A gasket comprising:
a gasket body formed of a metal plate; and
a first locking hook portion formed to project from the gasket body and configured to abut against a portion of a side wall surface adjacent to a counter sealing surface; and
a second locking hook portion formed to project from the gasket body and abut against another portion of another side wall surface adjacent to the counter sealing surface, the second locking hook portion being separate and apart from the first locking hook portion,
wherein the first and second locking hook portions each include a curved portion at a distal end portion thereof that abuts against the respective portion of the side wall surfaces,
the first locking hook portion is formed to be bent toward an inside of the gasket body such that an angle made with the gasket body is an acute angle, which presses the curved portion thereof against the portion of the side wall surface by a spring force of the first locking hook portion being bent at the acute angle to allow the gasket body to hold the gasket body itself on the counter sealing surface,
the second locking hook portion is formed to be bent at a right angle to the gasket body, and abuts against the another portion of the another side wall surface to regulate a position of the gasket body with respect to the counter sealing surface, the curved portion of the second locking hook portion being a spherical portion, and
the first and second locking hook portions each include a proximal portion that is formed as one unitary piece with the gasket body, the proximal portions that are formed as one unitary pieces with the gasket body projecting laterally away from the gasket body and then being bent in a direction toward an interior of the gasket body.

2. The gasket according to claim 1, wherein the curved portion of the first locking hook portion that is bent at the acute angle is formed of a curved surface curved by bending the distal end portion of the first locking hook portion.

3. The gasket according to claim 1, wherein the curved portion of the first locking hook portion bent at the acute angle is a spherical projection.

4. The gasket according to claim 1, wherein surfaces of at least the first and second locking hook portions are covered with a rubber-like elastic member.

5. The gasket according to claim 1, wherein the gasket has an opening formed therein, and the spring force is exerted in a direction toward a center of the opening.

* * * * *